United States Patent [19]

Wolfe

[11] Patent Number: 4,629,707
[45] Date of Patent: Dec. 16, 1986

[54] HIGH STRENGTH, LOW MASS POROUS SILICON NITRIDE BASED ARTICLES

[75] Inventor: Robert W. Wolfe, Wysox, Pa.
[73] Assignee: GTE Products Corporation, Stamford, Conn.
[21] Appl. No.: 820,333
[22] Filed: Jan. 21, 1986
[51] Int. Cl.[4] ............................................. C04B 35/58
[52] U.S. Cl. ................................. 501/97; 252/12.2; 501/98; 501/152
[58] Field of Search ............................ 501/97, 98, 152; 252/12, 12.2

[56] References Cited

U.S. PATENT DOCUMENTS

| | | | |
|---|---|---|---|
| 3,827,892 | 8/1974 | McCauley | 252/12 |
| 4,280,850 | 7/1981 | Smith et al. | 501/97 |
| 4,356,136 | 10/1982 | Mangels | 501/97 |
| 4,455,275 | 6/1984 | Alderborn et al. | 264/332 |

Primary Examiner—Helen M. McCarthy
Attorney, Agent, or Firm—Donald R. Castle; L. Rita Quatrini

[57] ABSTRACT

An article is disclosed which is made of silicon nitride based material consisting essentially of in percent by weight about 6% yttrium oxide and the balance silicon nitride. The article has open porosity of from about 37% by volume at which level the strength of the article is about 15 ksi to about 10% by volume open porosity at which level the strength of the article is about 72 ksi.

The article can have within its open porosity a lubricating material.

2 Claims, 2 Drawing Figures

HIGH STRENGTH, LOW MASS POROUS SILICON NITRIDE BASED ARTICLES

CROSS REFERENCE TO RELATED APPLICATIONS

Application Ser. No. 737,997, filed May 28, 1985 discloses and claims an article comprising particles of a silicon nitride based material and a lubricating material, the lubricating material occupying interconnected spaces within the article, the spaces being at least about 3% by volume of the article.

BACKGROUND OF THE INVENTION

This invention relates to a porous silicon nitride based article of high strength and low mass. It also relates to a porous silicon nitride based article of high strength and low mass which is impregnated with a lubricating material to make it self lubricating.

In applications such as rotating or oscillating shafts and bearings, high strength, low mass materials are important.

Self lubricating articles are used in various applications. For example cemented carbide shafts are used because of their high wear resistance. These articles have to be lubricated which is relatively expensive. They cannot be made self lubricating. Steel or bronze shafts which are oil impregnated are unsatisfactory because of unacceptably high wear on the shaft even though starting torque is low due to the oil. Self lubricating articles having high strength and low weight are desirable in various applications such as in shafts which can be used in place of bearings and sliding membranes.

SUMMARY OF THE INVENTION

In accordance with one aspect of this invention, there is provided an article which is made of silicon nitride based material consisting essentially of in percent by weight about 6% yttrium oxide and the balance silicon nitride. The article has open porosity of from about 37% by volume at which level the strength of the article is about 15 ksi to about 10% by volume open porosity at which level the strength of the article is about 72 ksi.

In accordance with another aspect of this invention, there is provided an article as described above having within its open porosity a lubricating material.

DETAILED DESCRIPTION OF THE INVENTION

Figure 1:
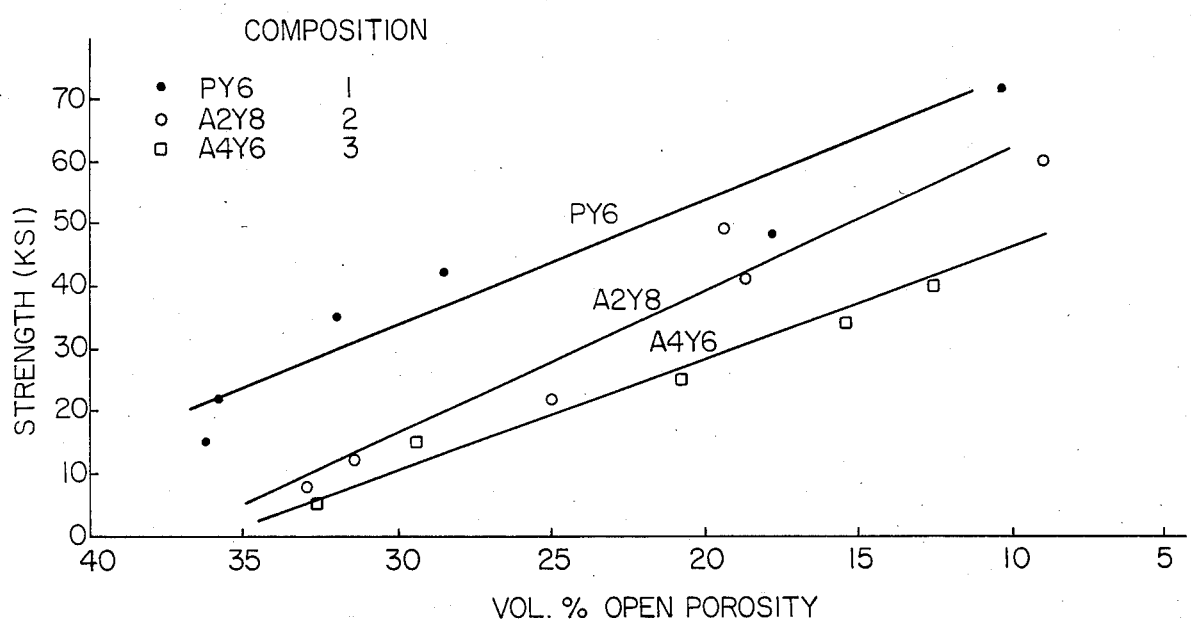
FIG. 1 is a plot of strength versus open porosity for several silicon nitride based compositions.

For a better understanding of the present invention, together with other and further objects, advantages, and capabilities thereof, reference is made to the following disclosure and appended claims in connection with the above described figures and description of some of the aspects of the invention.

The starting material used in making the article of this invention is a silicon nitride based material consisting essentially of in percent by weight about 6% yttrium oxide and the balance silicon nitride. The silicon nitride can be any silicon nitride. It will be apparent to those familiar with the art that the silicon nitride can contain up to about 6% by weight of silicon dioxide which is due to a generally unavoidable contamination in the silicon nitride powder. This is due to the adsorption and chemisorption of oxygen by finely divided silicon nitride powder.

According to one method of making the silicon nitride based material, the components of yttrium oxide and silicon nitride are first blended together by any conventional method wich results in a relatively uniform admixture suitable for the subsequent pressing, forming, and heating operations.

A preferred method involves first milling the components. The milling is done preferably in a polypropylene mill with silicon nitride milling media for preferably about 24 hours.

The resulting milled material is then preferably waxed. This can be done with stearic acid. The usual procedure is to dissolve the stearic acid in a solvent such as isopropanol. The resulting stearic acid solution is then stirred into the silicon nitride based material and the solvent is evaporated.

The resulting waxed material is then preferably screened through 60 mesh.

The screened material is then compacted such as by isopressing, dry pressing, or extruding into the desired shaped green article having a density of from about 55% to about 70% of the theoretical density.

The resulting green article is then dewaxed by standard methods such as by slow heating.

The resulting de-waxed article is then fired at a temperature sufficient to obtain the final article having the desired open porosity. The degree of open porosity in the article depends on the firing temperature. The variation of open porosity with temperature will be apparent in the Table following the Example.

The strength and bulk density of the article depend on the degree of open porosity. For example, for the preferred composition of this invention of 6% by weight yttrium oxide and the balance silicon nitride, for an open porosity of about 10% by volume, the strength is typically about 72 ksi; and for an open porosity of about 37% by volume, the strength is about 15 ksi.

The open porosity of the above described article can be impregnated with a lubricating material to produce a self lubricating article.

This operation can be done by any standard method known in the art. For example, the article can first be evacuated, followed by introduction of the lubricating material.

The lubricating material can be actually any lubricating material known in the art, for example, light machine oils which are generally introduced into the porous article by simply immersing the article in oil for a sufficient time to allow the oil to replace the air in the open pores of the article.

The lubricating material can be molybdenum disulfide in which case it is introduced into the sintered porous article by pressure infiltration to form the self lubricating article.

To more fully illustrate this invention, and to compare strength versus degree of open porosity and bulk density of several compositions including the composition of this invention, the following non-limiting example is presented.

EXAMPLE

The following silicon nitride based compositions are prepared: (percent by weight)
1. About 6% yttrium oxide, balance silicon nitride. (PY6)
2. About 8% yttrium oxide, about 2% aluminum oxide, balance silicon nitride. (A2Y8)
3. About 6% yttrium oxide, about 4% aluminum oxide, balance silicon nitride. (A4Y6)

The compositions are each prepared by dry milling the respective components in a polypropylene mill with silicon nitride media for about 24 hours. The compositions are then waxed with about 8% by weight stearic acid by dissolving the stearic acid in ispropanol, stirring in the powder and evaporating the solvent. Next the compositions are screened through about 60 mesh and isopressed at about 35 ksi into the shape of about ¼" diameter cylinders. The compositions are then dewaxed by heating slowly to about 500° C. The compositions are then fired at various temperatures from about 1300° C. to about 1900° C. The volume percent open porosity, bulk, density, and strength (modulus of rupture) are determined.

$$\text{The volume \% open porosity} = \frac{W_{sat} - W_{dry}}{W_{sat} - W_{sus}} \times 100$$

$$\text{The bulk density} = \frac{W_{dry}}{W_{sat} - W_{sus}}$$

$W_{sat}$ = weight of object after boiling in water
$W_{dry}$ = dry weight of object
$W_{sus}$ = weight of object after boiling suspended in water
Strength = Modulus of rupture (MOR) of ⅛" cylinder in 4 point loading $$MOR(PSI) = \frac{2.456\ S(Lo - Li)}{D^3}$$

S = load, lbs.
(Lo-Li) = (length outer span—length inner span) = 0.500" in this case
D = diameter, in. = 0.125" in this case.

Figure 2:
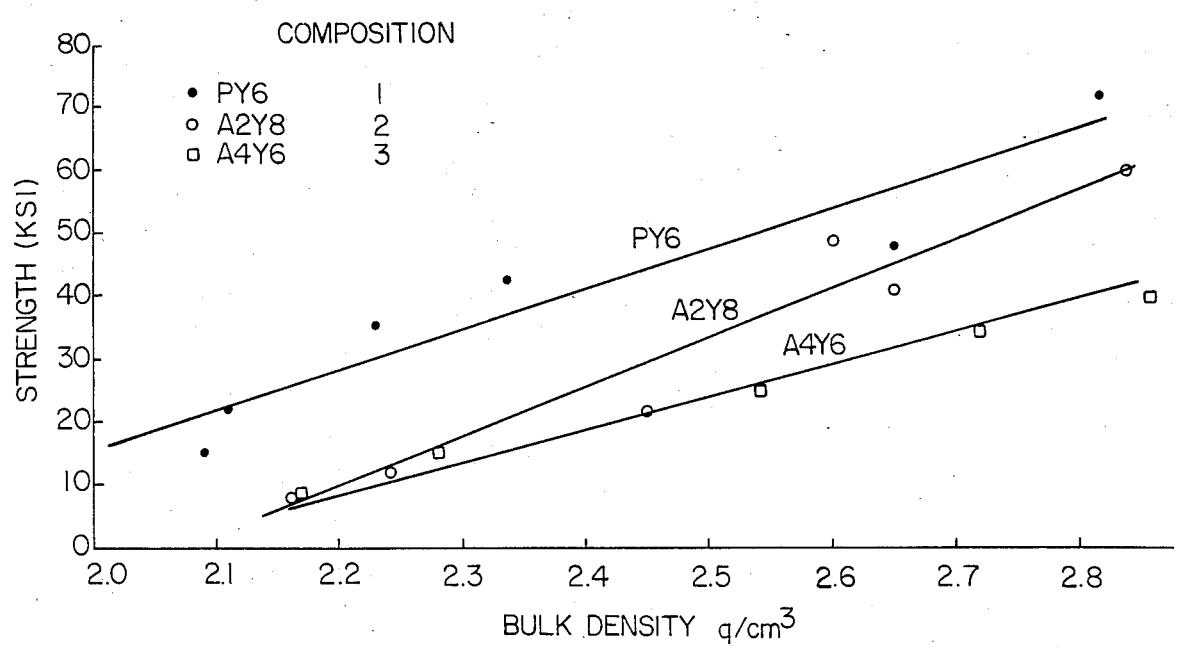
FIG. 2 is a plot of strength versus bulk density for several silicon nitride based compositions.

The Table shows the tabulated physical properties of the articles from the respective compostions. FIGS. 1 and 2 show the strength (4 pt MOR ⅛" cylinders) vs vol% open porosity and strength vs bulk density characteristics. It is clear from FIGS. 1 and 2 that the composition of this invention, the 6% by weight yttrium oxide and silicon nitride has superior strength/open porosity and strength/bulk density ratios compared to the other materials.

TABLE

Physical Properties of Several Silicon Nitride Based Composition Articles

| Material | Firing Temp. (°C.) | Vol. % Open Porosity | Bulk Density g/cc | Strength ksi |
|---|---|---|---|---|
| 6 wt % Y₂O₃ balance Si₃N₄ | 1510 | 36.2 | 2.09 | 15 |
| | 1570 | 35.8 | 2.11 | 22 |
| | 1630 | 32.0 | 2.23 | 35 |
| | 1690 | 28.5 | 2.34 | 42 |
| | 1780 | 17.8 | 2.65 | 48 |
| | 1870 | 10.2 | 2.82 | 72 |
| 2 wt % Al₂O₃ 8 wt % Y₂O₃ balance Si₃N₄ | 1280 | 33.0 | 2.16 | 8 |
| | 1360 | 31.4 | 2.24 | 12 |
| | 1450 | 25.0 | 2.45 | 22 |
| | 1510 | 18.6 | 2.65 | 41 |
| | 1570 | 19.3 | 2.60 | 49 |
| | 1630 | 8.9 | 2.84 | 60 |
| 4 wt % Al₂O₃ 6 wt % Y₂O₃ balance Si₃N₄ | 1310 | 32.7 | 2.17 | 9 |
| | 1370 | 29.4 | 2.28 | 15 |
| | 1420 | 20.8 | 2.54 | 25 |
| | 1510 | 15.4 | 2.72 | 34 |
| | 1570 | 12.6 | 2.86 | 40 |

While there has been shown and described what are at present considered the preferred embodiments of the invention, it will be obvious to those skilled in the art that various changes and modifications may be made therein without departing from the scope of the invention as defined by the appended claims.

What is claimed is:

1. An article made of silicon nitride based material, said material consisting essentially of in percent by weight about 6% yttrium oxide, and the balance silicon nitride, said article having an open porosity of from about 37% by volume at which level of porosity the strength of said article is about 15 ksi, to an open porosity of about 10% by volume at which level of porosity the strength of said article is about 72 ksi.

2. An article made of silicon nitride based material, said material consisting essentially of in percent by weight about 6% yttrium oxide, and the balance silicon nitride, said article having an open porosity of from about 37% by volume at which level of porosity the strength of said article is about 15 ksi, to an open porosity of about 10% by volume at which level of porosity the strength of said article is at least about 72 ksi, said article having within its open porosity a lubricating material.

* * * * *